United States Patent [19]

Obermeyer et al.

[11] 4,173,513
[45] Nov. 6, 1979

[54] NUCLEAR REACTOR WITH CONTROL RODS

[75] Inventors: Franklin D. Obermeyer, Pensacola; Robert T. Berringer, Gulf Breeze, both of Fla.

[73] Assignee: Westinghouse Electric Corp., Pittsburgh, Pa.

[21] Appl. No.: 813,564

[22] Filed: Jul. 7, 1977

[51] Int. Cl.² ............................................. G21C 15/00
[52] U.S. Cl. ..................................... 176/50; 176/36 R
[58] Field of Search ........................ 176/50, 61, 38, 35, 176/36 R, 86 R, 43

[56] References Cited

U.S. PATENT DOCUMENTS

| | | | |
|---|---|---|---|
| 3,481,832 | 12/1969 | Rickert | 176/86 R |
| 3,595,748 | 7/1971 | Frisch et al. | 176/36 R |
| 3,607,629 | 9/1971 | Frisch et al. | 176/36 R |
| 3,940,311 | 2/1976 | Frisch et al. | 176/36 R |
| 4,064,002 | 12/1977 | Desmarchais et al. | 176/50 |

*Primary Examiner*—Harvey E. Behrend
*Attorney, Agent, or Firm*—Edward L. Levine; Z. L. Dermer

[57] ABSTRACT

A liquid-cooled nuclear reactor including fuel assemblies mounted within a reactor vessel having linearly movable control rods passing through control rod guide tubes into respective aligned fuel assemblies. Reactor coolant circulates through the assemblies, guide tubes and other vessel internals structures located above the assemblies and is discharged through an outlet nozzle positioned above the elevation of primary flow openings in the guide tube walls. The guide tube includes internal horizontal supports and a length limited continuous control rod guide which, in conjunction with the flow openings, alleviate detrimental coolant cross flows and frictional restraints imposed upon the control rods.

3 Claims, 6 Drawing Figures

# NUCLEAR REACTOR WITH CONTROL RODS

BACKGROUND OF THE INVENTION

1. Field of the Invention

This invention relates to liquid-cooled nuclear reactors and more particularly to reactors having linearly movable control rods and guide tubes for guiding the control rods through the reactor vessel upper internals and into aligned core fuel assemblies.

2. Description of the Prior Art

Many liquid-cooled nuclear reactors utilize a core of vertically positioned fuel assemblies within a reactor vessel. A reactor upper internals structure is positioned above the fuel assemblies and, among other functions, serves to restrain upward movement of the fuel assemblies and to guide reactor control rods from above the fuel assemblies into and out of the core.

The large volume and velocity of reactor coolant exiting the core, in the range of hundreds of thousands of gallons per minute, results in significant loads on the reactor upper internals components and the control rods. Also, the control rod guide tubes of the upper internals impose a frictional restraint upon the control rods during motion which detrimentally affects the insertion time interval. It is therefore desirable to provide structure which accounts for these loads and mitigates their potentially detrimental effects.

SUMMARY OF THE INVENTION

This invention provides a nuclear reactor circulating a liquid coolant which lessens undesirable loadings on reactor structure, particularly the control rods and control rod guide tubes. It includes a pressure vessel housing a core of vertically positioned parallel fuel assemblies seated on a lower core plate and bounded above by an upper internals structure including an upper core plate directly above the core, an upper support spaced above the upper core plate, and control rod guide tubes and support columns vertically extending between the upper support and the upper core plate.

In the main embodiment reactor coolant primarily flows upwardly through the core, the upper core plate, and into the guide tubes and support columns. The support columns transmit the major portion of the loads on the upper core plate to the upper support and ultimately to the reactor vessel. The guide tubes direct reciprocating control rods into aligned fuel assemblies. Most of the coolant entering the guide tubes and support columns is radially discharged and then exits the reactor vessel through outlet nozzles in the vessel side wall.

The guide tubes include a number of perforated horizontal supports affixed at spaced intervals along the length of the guide tube, and a perforated bottom support affixed at the bottom of the guide tube. The horizontal and bottom supports have perforations shaped to allow passage of the control rods. Between the bottom support and the lowermost horizontal support the wall of the guide tube includes primary flow openings for radially discharging reactor coolant. Throughout the same length the guide tube includes a continuous control rod guide, selectively perforated. The lowermost horizontal support, which defines the upper boundary of the guide tube primary flow openings and the continuous guide length, is located at an elevation below the elevation of the vessel outlet nozzles.

The preferred guide tube is generally square, and each horizontal support is welded to the guide tube enclosure through four weld surfaces, one on each of the four sides of the square, allowing a long, continuous, and hence strong weld. The primary flow openings below the lowermost horizontal support are preferably arranged in two parallel vertically spaced rows, separated solely by a continuous horizontal ligament.

The operational advantages of this structure are numerous and include a low frictional restraint on the control rods as a result of the relatively short continuous guide region. Further, as the primary flow openings are located below the elevation of the outlet nozzles, the bulk of the coolant entering a guide tube is radially discharged in the continuous guide region, thereby protecting the control rods from detrimental cross flows. Discharge at higher elevations would be complicated by the strong radial flow tendencies imposed by the large mass of coolant flowing toward the outlet nozzles which imparts detrimental cross flow loading on the control rods, potentially resulting in rod damage or increased scram time. Increasing the length of the continuous guide region to counteract this loading would not only result in increased cost, increased frictional resistance, and additional complexity, but would also result in a major structural discontinuity closer to the center regions of the guide tube, where the bending moment is high. Also, the continuous horizontal ligament between primary flow opening rows provides a strong guide tube to resist bending and other loads in the area of the continuous guide discontinuity. And, the elongated length of welds joining the horizontal support and the guide tube alleviate weak areas about the flow openings.

BRIEF DESCRIPTION OF THE DRAWINGS

The advantages, nature, and additional features of this invention will become more apparent from the following description taken in connection with the accompanying drawings, in which.

DESCRIPTION OF THE PREFERRED EMBODIMENTS

Figure 1:
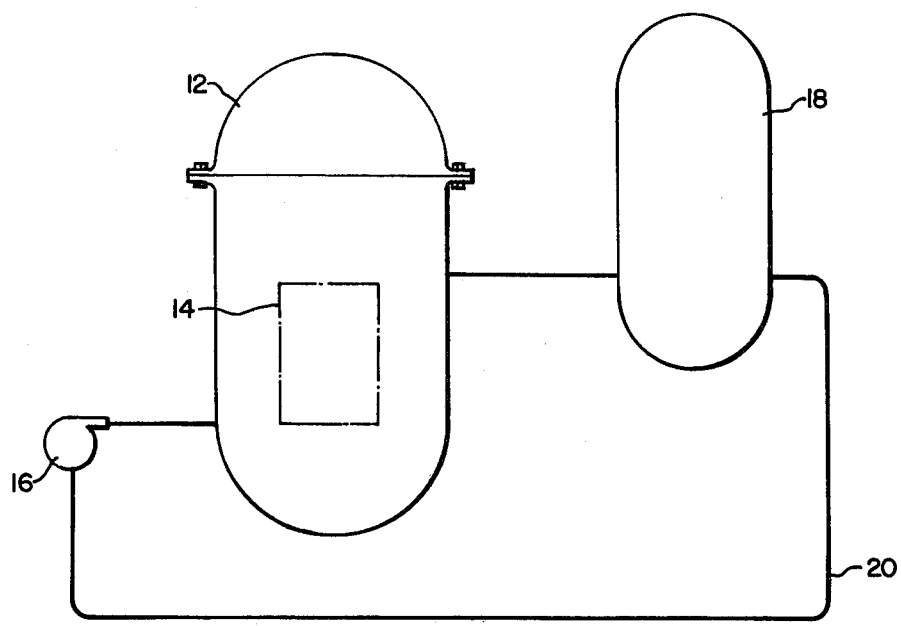
FIG. 1 is a simplified schematic of a nuclear reactor system to which this invention may be applied.

Referring now to the drawings, FIG. 1 shows a simplified nuclear reactor primary system including a generally cylindrical reactor pressure vessel 10 having a closure head 12 enclosing a nuclear core 14. A liquid reactor coolant, such as water, is pumped into the vessel 10 by pump 16, through the core 14 where heat energy is absorbed, and is discharged to a heat exchanger 18, typically referred to as a steam generator, in which heat is transferred to a utilization circuit (not shown), such as a steam cycle driving turbine-generator apparatus. The reactor coolant is then returned to the pump 16, completing the primary loop. Typically a plurality of the above described loops are connected to a singular reactor vessel 10 by reactor coolant piping 20.

Figure 2:
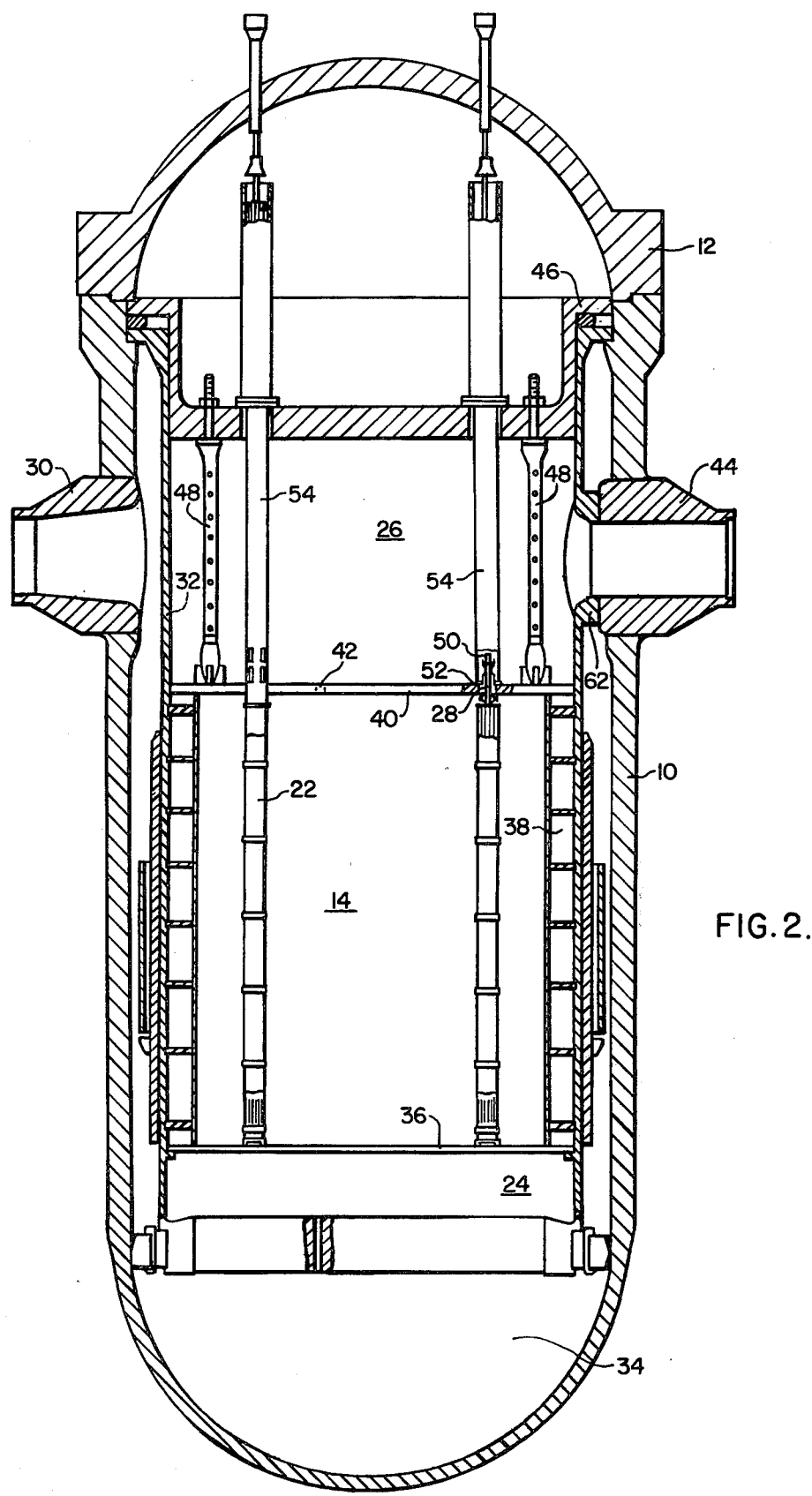
FIG. 2 is an elevation view, partially in section, of a nuclear reactor vessel and internal components, incorporating this invention.

This invention primarily addresses the flow of reactor coolant and the structures within the reactor vessel 10, as shown in FIG. 2. In addition to the core 14, comprised of a plurality of parallel, vertical, coextending fuel assemblies 22, for purposes of description the other vessel internal structures can be divided into the lower internals 24 and the upper internals 26. The lower internals function to support, align, and guide core components and instrumentation, as well as to direct coolant flow within the vessel. The upper internals restrain, or provide a secondary restraint for the fuel assemblies 22, and support and guide instrumentation and components such as control rods 28.

In the exemplary reactor shown, coolant enters the vessel 10 through one or more inlet nozzles 30, flows downward about a core barrel 32, is turned 180° in a lower plenum 34, passes upwardly through a lower core plate 36 upon which the assemblies 22 are seated, and through and about the assemblies. The coolant flow through the core and surrounding annular area 38 is typically large, on the order of four hundred thousand gallons per minute at a velocity of approximately twenty feet per second. The resulting pressure drop and frictional forces tend to cause the assemblies to rise, which movement is restrained by the upper internals including a circular upper core plate 40. Coolant exiting the core 14 flows along the underside of the upper core plate 40 and upwardly through a plurality of perforations 42. As discussed further hereinbelow, the coolant then flows upwardly and radially to one or more outlet nozzles 44.

The upper internals 26 can be supported from the vessel or vessel head, and include an upper support 46. Loads are transmitted between the upper support 46 and upper core plate 40 primarily by a plurality of support columns 48. A support column is aligned above a selected fuel assembly 22 and perforation 42.

Rectilinearly movable control rods 28, typically including a drive shaft 50 and a spider assembly 52 of neutron poison rods, are guided through the upper internals 26 and into aligned fuel assemblies 22 by control rod guide tubes 54. The guide tubes are fixedly joined to the upper support 46, and connected by a split pin 56 (FIG. 3) force-fit into the top of the upper core plate 40. The pin configuration provides for ease of guide tube assembly and replacement, if ever necessary, and assures that core loads, particularly under seismic or other high loading accident conditions, are taken primarily by the support columns 48 and not the guide tubes 54. This assists in retarding guide tube deformation under accident conditions which could detrimentally affect control rod insertion capability.

Although significant axial loads are not applied to the guide tubes, lateral loads, resulting in high bending moments and shear forces, are applied by the large coolant mass flow. It is critical that alignment between a guide tube and its respective fuel assembly be maintained to insure proper control rod insertion. The pin connection assures limited radial displacement of the guide tube. In its response to lateral loads, however, the guide tube can be analyzed as a vertical beam loosely fixed at the lower extremity by the pin 56, and tightly fixed at the upper extremity by fastening means such as the bolts 58. Strong radial flow forces are imposed by coolant flow within the upper internals towards the vessel outlet nozzles 44 and matingly engaged core barrel outlet nozzle 62. Typically no more than four outlet nozzles 44, 62, one for each primary loop, are utilized. And, because of total plant layout considerations, the nozzles are non-symmetrically positioned about the vessel circumference. A complex flow pattern therefore results in the upper internals 26, with coolant exiting the core and flowing toward the outlet nozzles (cross flow).

Figure 3:
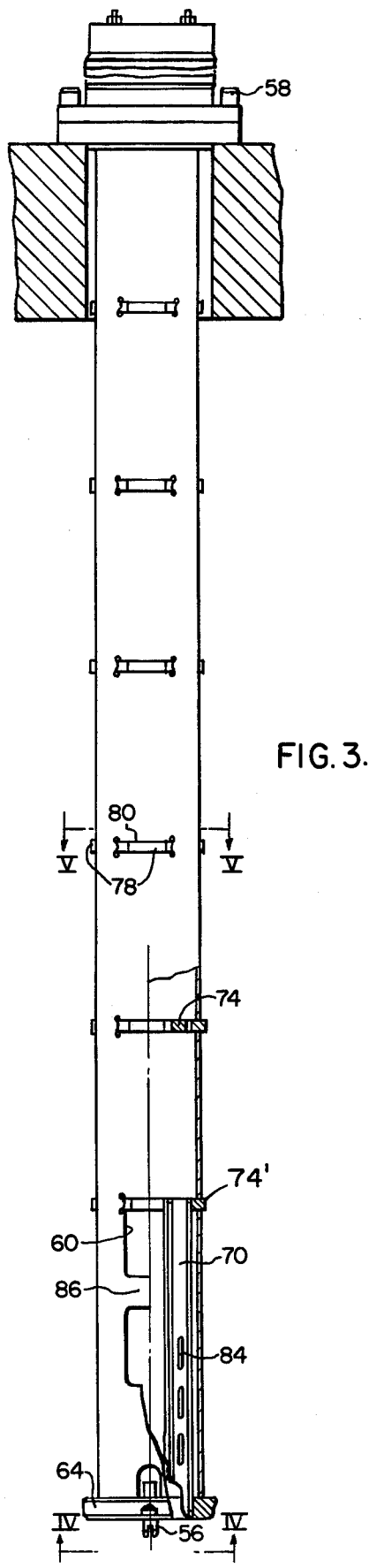
FIG. 3 is an elevation view, partially in section, of a guide tube consistent with this invention.
Figure 4:
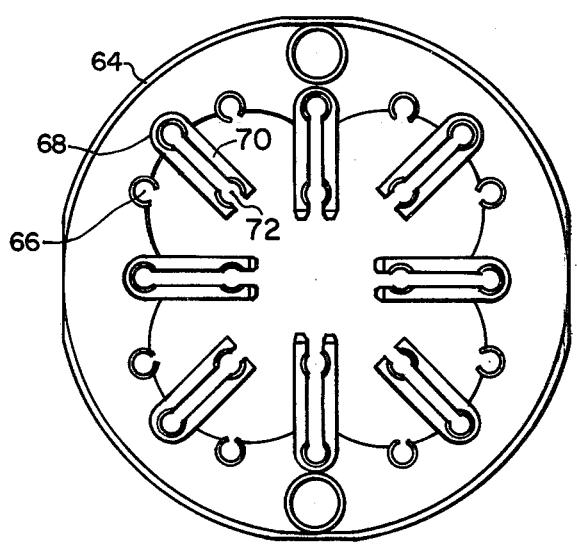
FIG. 4 is a plan view taken at IV—IV of FIG. 3.
Figure 5:
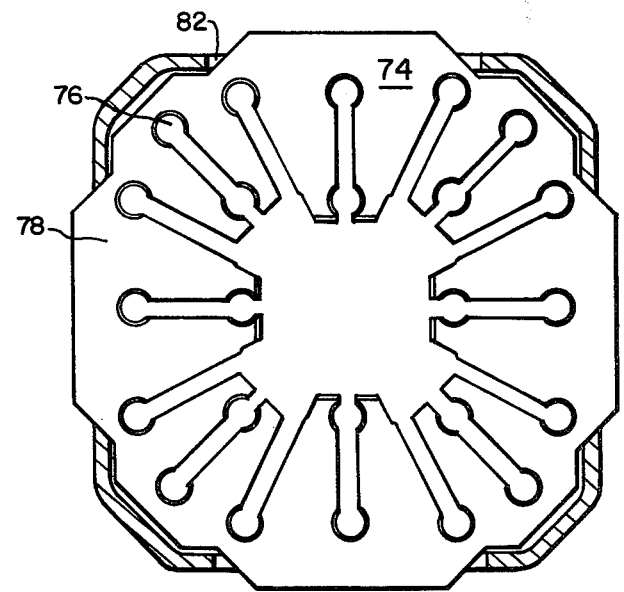
FIG. 5 is a plan view, in section, taken at V—V of FIG. 3.

Cross flow forces are particularly detrimental to the control rods in that these forces increase frictional resistance and the time interval for control rod operation. It has been found, however, that the flow forces on the control rod shaft 50 and spider assembly 52 can be lessened, and guide tube structural integrity increased, by utilization of a guide tube oriented as disclosed herein. The guide tube as shown in FIGS. 3 through 5 is of generally rectangular or square cross section. Other configurations can be utilized and, in this regard, it is to be understood that the term "tube", as used herein and in the appended claims, refers to a thin walled elongated configuration, not necessarily of circular cross section. The bottom of the guide tube is affixed to a bottom support 64 having perforations 66 (FIG. 4) contoured to slidingly receive the spider assembly 52, and slots 68 for receiving continuous control rod guides 70. The guides 70 also have slots 72 for slidingly receiving a spider assembly. At preselected spaced elevations along the guide tube length are positioned horizontal supports 74 which add to guide tube structural integrity and also include perforations 76 for control rod spider 52 and shaft 50 passage. Each horizontal support preferably includes a singular weld surface 78 on each of four sides which protrude through mating weld openings 80 in the guide tube. The top and bottom faces of the surface 78 are welded to the guide tube opening 80, leaving a clearance 82 at the surface sides for discharge of relatively small amounts of the coolant from the guide tube.

Figure 6:
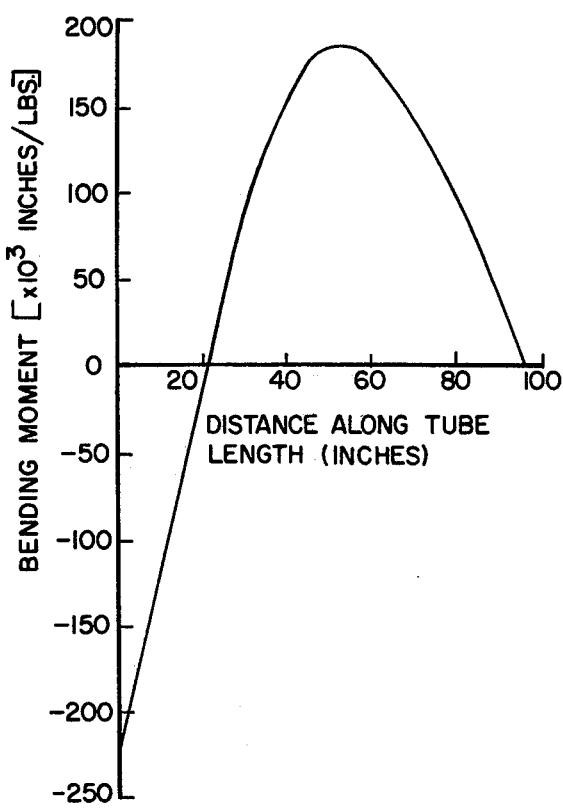
FIG. 6 is a graphical representation of the bending moment of a guide tube, the Y axis being bending moment in inch-pounds, and the X axis being distance along the tube length, in inches.

The lowermost horizontal support 74' defines the upper boundary of the continuous guide 70 and of the primary flow openings 60. This lowermost support is positioned at an elevation below the elevation of the outlet nozzles 44, 62. This positioning and guide tube configuration provides significant operational advantages. It has been found that greater than eighty percent of the guide tube coolant flow will exit the guide tube through the primary flow openings as provided herein. The continuous guides 70, with flow openings 84, provide lateral restraint while placing minimum frictional and cross flow resistance upon the control rods 52. Additional continuous guide length could unnecessarily provide extensive frictional resistance. Also, the top of the guides represents a point of discontinuity along the tube. It is highly desirable to orient this discontinuity at a position of low bending mement. As shown in FIG. 6, the guide tube bending moment progressively increases to a positive maximum at about mid-span. Therefore, it is desirable to maintain the continuous guide section as short as possible consistent with support limitations.

It is also desirable to orient the primary flow openings 60 not only to allow for discharge of at least eighty percent of the coolant flow, but also to match the pressure drop on the coolant flowing into a guide tube and into a support column. This not only lessens cross flows above the upper core plate 40, but also immediately beneath the plate 40 at the fuel assembly exits, thereby minimizing cross flow excitations on the fuel assemblies. It is further advantageous for structural purposes to arrange the primary openings in rows, preferably two, separated only by a continuous horizontal ligament 86. The ligament 86 maintains tube strength while allowing sufficient flow discharge. It is also evident that a relatively short continuous guide region will lessen total reactor coolant pressure drop, thereby increasing total reactor efficiency.

In a preferred upper internals configuration in accordance with this invention, the top of the upper core plate 40 is spaced forty inches below the centerline of the outlet nozzles 44, which have a thirty inch inside diameter. The centerline of the lower most horizontal support 74 is spaced 21.3 inches above the top of the upper core plate. Subsequent horizontal supports are spaced at intervals of twelve and one-half inches, centerline-to-centerline. And, the top of the primary flow openings 60 is spaced twenty inches above the upper core plate 40, which is five inches below the bottom of the outlet nozzle flow area.

There has therefore been disclosed a liquid-cooled nuclear reactor including an upper internals structure which protects control rods and other members from excessive undesirable loads so as to assure operational integrity. While the invention has been discussed primarily in reference to a specific illustrative example, it is to be understood that within the scope of the appended claims the invention may be practiced other than as specifically described.

I claim:

1. A nuclear reactor including a pressure vessel, fuel assemblies mounted within said vessel between a perforated lower core plate and a perforated upper core plate, an upper support spaced above said upper core plate, means for circulating a liquid coolant through said vessel and fuel assemblies including a vessel outlet nozzle disposed at an elevation between the elevations of said upper core plate and upper support, a support column mounted to said upper core plate and said upper support in vertical alignment with one of said fuel assemblies, a control rod guide tube mounted between said upper core plate and said upper support plate in vertical alignment with another one of said fuel assemblies for slidingly receiving a rectilinearly movable control rod and being sized to receive a substantial portion of said coolant exiting said another fuel assembly, said guide tube having a plurality of perforated horizontal supports affixed substantially within said guide tube at preselected spaced elevations along said guide tube and a perforated bottom support affixed to the bottom of said guide tube, a plurality of primary flow openings in the wall of said guide tube between said bottom support and the lowermost of said horizontal supports, said guide tube being impervious to substantial radial discharge of coolant except for discharge through said primary openings, and a continuous control rod guide extending and affixed between said bottom support and said lowermost horizontal support, said lowermost support being positioned at an elevation below the elevation of the flow area of said outlet nozzle.

2. The reactor of claim 1 wherein said guide tube primary flow openings are arranged in two parallel rows vertically spaced by a continuous horizontal ligament formed by the wall of said guide tube.

3. The reactor of claim 1 wherein the wall of said guide tube is of generally rectangular cross section.

* * * * *